(12) United States Patent
Jackson

(10) Patent No.: US 6,275,577 B1
(45) Date of Patent: Aug. 14, 2001

(54) CALL HANDLING

(75) Inventor: Allen Jackson, Penngrove, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/138,093

(22) Filed: Aug. 21, 1998

Related U.S. Application Data

(63) Continuation of application No. 08/671,679, filed on Jun. 28, 1996, now abandoned.

(51) Int. Cl.[7] ............................................ H04M 3/42
(52) U.S. Cl. .................. 379/210; 379/88.15; 379/373; 455/417
(58) Field of Search ..................... 379/372, 373, 379/376, 67.1, 88.11, 88.12, 88.15, 88.19, 88.2, 88.21, 201, 210, 211, 212, 213, 214; 455/417, 426, 428, 458, 31.1, 31.2, 31.3, 414, 461

(56) References Cited

U.S. PATENT DOCUMENTS

| | | | |
|---|---|---|---|
| 4,232,199 | * | 11/1980 | Boatwright et al. . |
| 4,942,598 | * | 7/1990 | Davis .................................. 379/67 X |
| 5,175,758 | * | 12/1992 | Levanto et al. ......................... 379/57 |
| 5,206,901 | | 4/1993 | Harlow et al. . |
| 5,327,486 | * | 7/1994 | Wolff et al. ....................... 379/142 X |
| 5,329,578 | | 7/1994 | Brennan et al. . |
| 5,375,161 | * | 12/1994 | Fuller et al. ............................. 379/57 |
| 5,454,032 | | 9/1995 | Pinard et al. . |
| 5,548,636 | * | 8/1996 | Bannister et al. .................... 379/201 |
| 5,557,660 | * | 9/1996 | Crevits et al. ....................... 379/215 |
| 5,600,714 | * | 2/1997 | Ahlberg et al. ......................... 379/58 |
| 5,724,411 | * | 3/1998 | Eisdorfer et al. .................. 379/93.23 |
| 5,802,160 | * | 9/1998 | Kugell et al. ......................... 379/201 |
| 6,058,178 | * | 5/2000 | McKendry et al. .................. 379/212 |

FOREIGN PATENT DOCUMENTS

| | | |
|---|---|---|
| 42 33 064 | 4/1994 | (DE) . |
| 5-063823 | 3/1993 | (JP) . |
| 94 06236 | 3/1994 | (WO) . |

* cited by examiner

Primary Examiner—Scott L. Weaver
(74) Attorney, Agent, or Firm—Carter, Ledyard & Milburn

(57) ABSTRACT

A method of routing an incoming telephone call to a called party having plural telephone numbers in which a telephone call for the called party is received at a switching system, and automatically screened to determine where the received call is to be routed among plural devices with different telephone numbers for accessing the called party, where the devices may include a wireless telephone and a pager. The screening step determines whether the received call is to be routed to the wireless telephone and the pager. If the received call is to be routed to the wireless telephone and the pager in response to the screening, it is routed in parallel.

16 Claims, 1 Drawing Sheet

CALL HANDLING

This is a continuation of application Ser. No. 08/671,679, filed Jun. 28, 1996 now abandoned.

BACKGROUND OF THE INVENTION

The present invention relates to methods of routing received telephone calls, and more particularly to a method of routing a received call to one or more of plural telephone numbers at which a called party may be reached which simplifies the called party's acceptance of the call.

Busy individuals, particularly business people, may have several telephone numbers at which they can be reached, such as numbers for a portable wireless phone, a pager, an office phone, automatic voice-mail, a manual message service, etc. ("Wireless" refers to any conventional cordless telephone connection, such as mobile, cellular, etc.) When a call for the individual is received at a local switching system, such as a company's PABX, the switching system routes the received call as last directed by the individual. In the absence of such directions, the call may be routed to a predetermined number, such as the office phone or a pager. The pager alerts the individual that he has received a call by aural indication or some other less intrusive means such as vibration. The individual then may connect to the received call on the wireless phone by entering special codes or a sequence of keystrokes on the wireless phone.

This arrangement works satisfactorily for some, but is not without room for improvement. For example, the called party would like to reduce the number of key strokes required to connect the called party to the received call on the wireless phone in response to the page, preferably to a single stroke. Further, the called party would like to limit the routing of page requests and calls to the wireless phones during certain periods, such as by limiting pages and calls to those from predetermined numbers during an important meeting.

Accordingly, it is an object of the present invention to provide a novel method of routing telephone calls to plural telephone numbers at a which a called party may be reached which obviates the problems of the prior art.

It is another object of the present invention to provide a novel method of routing telephone calls which reduces the number of key strokes needed to connect a wireless phone to a received call in response to a page, preferably to a single key stroke.

It is yet another object of the present invention to provide a novel method of routing telephone calls which automatically screens incoming calls and routes calls to the called party's page and wireless phone or to the called party's answering system.

It is still another object of the present invention to provide a novel method of routing telephone calls in which incoming calls are automatically screened based on the identity of the calling party and in which some calls are routed in parallel to the called party's pager and wireless phone and other calls are routed to the called party's answering system, and in which the called party may respond to a page by connecting to the received call without laborious entry of key strokes because the incoming call has been routed in parallel thereto.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
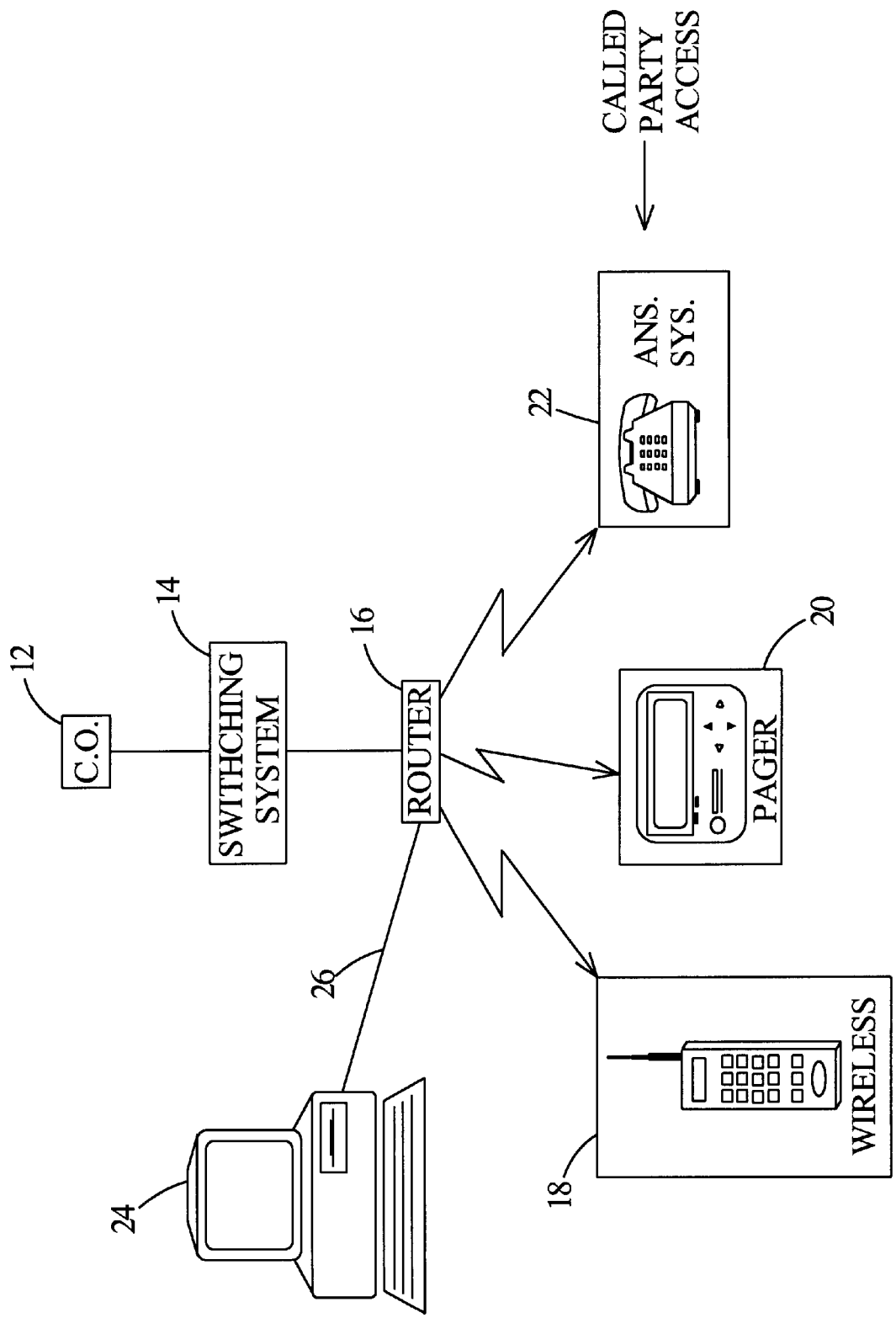
FIG. 1 is a block diagram illustrating routing of incoming calls in an embodiment of the present invention.

With reference now to FIG. 1, an incoming call from central office 12 may be provided to a conventional switching system 14, such as an office PABX, for routing by router 16 to the called party who has several telephone numbers, each associated with a different device. The devices to which an incoming call may be routed by router 16 include wireless telephone 18, pager 20 and an answering system 22 (e.g., automatic voice-mail, manual message service, conventionally wired office telephone with or without an answering machine.)

Router 16 initially screens a received call to determine where it is to be routed. Screening may be based on the identity of the originator of the received call as indicated by information in the received call, such as calling line identification, DNIS number, telephone number called, and account number, or by information which may be requested of the calling party, such as letters of last name or a prearranged code. Router 16 compares the received information to a predetermined screening list or other data and determines whether the received call is to be routed to the called party's wireless phone 18 and pager 20 or to the called party's answering system 22.

If the received call is to be routed to the wireless phone and pager, router 16 provides the received call in parallel paths to wireless phone 18 and pager 20 so that the received call is immediately available for connection by either. Router 16 provides a page request to pager 20 and attempts to alert wireless phone 18 by sending a call request. Pager 20 alerts the called party that a call has been received. If the called party chooses to answer the call on wireless phone 18, he may do so by pressing the on or call key which may be accomplished with a single key stroke on most conventional wireless phones (on some phones this may be preceded by separately turning the phone on if needed.) The presence of the received call in the parallel path to wireless phone 18 permits this rapid and simple connection with the received call. Router 16 may hold the received call in the parallel path for an appropriate time after the pager request has been sent to allow time for connection of wireless phone 18 to the received call. If wireless phone 18 is not answered, the call may be routed by router 16 to answering system 22.

Router 16 may be any appropriate circuit, integrated or otherwise, for accomplishing these functions and may be provided by one of skill in the art without undue effort. A memory of appropriate size may be provided for storing screening criteria, and a comparator may be provided for evaluating incoming calls against the stored criteria. Router 16 may be integral with switching system 14 or may be an addition thereto. Desirably the selection and updating of screening criteria may be made by the called party's from a conventional phone, wireless telephone 18 or answering system 22. To this end, access codes may be provided to restrict access to the screening criteria. Screening criteria may also be updated from a computer 24 through a local area network 26 or the like which is connected to router 16.

In a preferred embodiment of the method of routing an incoming telephone call to a called party having plural telephone numbers, a telephone call for the called party is received at a switching system, and automatically screened to determine where the received call is be routed among plural devices with different telephone numbers for accessing the called party, where the devices may include a wireless telephone and a pager. The screening step determines whether the received call is to be routed to the wireless telephone and the pager. If the received call is to be routed to the wireless telephone and the pager in response to the screening, it is routed in parallel. The routing to the pager includes the initiation of a pager request to the pager in parallel to the wireless telephone routing.

In further embodiments the received call is routed to an answering system if the received call is not to be routed in parallel to the wireless telephone and the pager. The received call may also be routed to the answering system if the wireless telephone is not connected to the received call in response to the pager request within an appropriate time period.

If a page request has been made, a ringback tone to the received call may be delayed slightly to avoid the human perception that the call will not be answered.

During the screening step at least one of calling line identification, DNIS number, telephone number requested by the received call, and account number may be determined for the received call. Alternatively, or in addition the screening step may include the step of automatically requesting information about an initiator of the received call.

A message from the wireless telephone may be provided after connection to the received call. For example, if the called party wants to take the call on the wireless phone but would like to ask the calling party to wait, a function may be provided to automatically send a voice message to the calling party, such as "please wait and the called party will be with you shortly."

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of silently alerting a called party as to the existence of a telephone call on a wireless telephone comprising the steps of:
   (a) receiving a telephone call at a telephone switching system;
   (b) routing the telephone call from the switch to a wireless telephone identified by the switch with a called party without activating an audible alert; and
   (c) activating an inaudible alert of a pager identified by the switch with the called party to thereby alert the called party of the availability of the telephone call at the wireless telephone.

2. A method of connecting a telephone call to a called party comprising the steps of:
   (a) receiving a telephone call at a telephone switching system;
   (b) routing the telephone call from the switch to a wireless telephone identified by the switch with a called party without activating an audible alert; and
   (c) activating an inaudible alert of a pager identified by the switch with the called party to thereby alert the called party of the availability of the telephone call at the wireless telephone; and
   (d) in response to the inaudible alert, pressing a call-connect key at the wireless telephone to thereby selectively connect the telephone call to the wireless telephone.

3. A method of routing a telephone call comprising the steps of:
   (a) receiving a telephone call directed to a first personal communication device associated with the called party;
   (b) automatically routing the telephone call to a second personal communication device associated with the called party; and
   (c) in parallel to routing the telephone call to the second personal communication device, transmitting to a third personal communication device associated with the called party a message for informing the called party of the routing of the telephone call to the second personal communication device.

4. A portable call forwarding method comprising the steps of:
   (a) receiving at a switching system a telephone call directed to a called party;
   (b) obtaining information relating to the calling party from the telephone call;
   (c) selecting one or more telecommunication devices as a function of the obtained information;
   (d) simultaneously,
       (i) routing the telephone call to the selected one or more telecommunication devices, and
       (ii) transmitting a message to a telecommunication device other than the selected one or more telecommunication devices, the message including both the obtained information and information identifying the selected telecommunication devices.

5. A method of routing a telephone call seeking access to a party through one of a plurality of communication associated with the party, the method comprising the steps of:
   (a) receiving at a switching system a telephone call seeking access to a party through a first communication device associated with the party;
   (b) obtaining information relating to the identity of a calling party from the telephone call;
   (c) selecting as a function of the obtained information one or more communication devices associated with the party;
   (d) routing the telephone call to the selected one or more devices; and
   (e) transmitting a message to a non-selected communication device, the message including both the obtained information and information identifying the selected communication devices.

6. The method of claim 5 wherein each of the communication devices has a different telephone number.

7. The method of claim 5 wherein each of the communication devices is for performing a different personal communication function.

8. The method of claim 5 wherein the steps of routing and transmitting a message are performed at the same time.

9. The method of claim 5 wherein the telephone call is automatically routed to a wireless telephone having an audible ringer.

10. The method of claim 9 wherein the message is transmitted to a pager.

11. The method of claim 10 wherein the steps of routing and transmitting a message are performed at the same time.

12. The method of claim 11 wherein the audible ringer of the wireless telephone is not triggered when the telephone call is available on the wireless telephone.

13. The method of claim 12 wherein the pager alerts the party with an inaudible stimulus.

14. The method of claim 13 further comprising the step of connecting the wireless telephone to the received call with a single key stroke entry at the wireless telephone.

15. The method of claim 5 wherein the step of obtaining information includes the step of obtaining one of the group of calling line identification, DNIS number, and account number.

16. The method of claim 5 wherein the step of obtaining information includes the step of automatically requesting information on an initiator of the received call.

* * * * *